W. H. THURSTON.
HAY-LOADER.

No. 182,970. Patented Oct. 3, 1876.

Witnesses:
J. N. McCloskey.
Thos. S. Minnick.

Inventor:
Wm. H. Thurston.

UNITED STATES PATENT OFFICE.

WILLIAM H. THURSTON, OF HEBRON, MINNESOTA.

IMPROVEMENT IN HAY-LOADERS.

Specification forming part of Letters Patent No. 182,970, dated October 3, 1876; application filed April 1, 1876.

*To all whom it may concern:*

Be it known that I, WILLIAM H. THURSTON, of Hebron, in the county of Nicollet and State of Minnesota, have invented an Improved Hay-Loader, of which the following is a specification:

My object is to rake and load directly from the swath, in the order in which it was cut, so that the last cut will have the time to cure that elapses while the first is being taken in.

Figure 2:
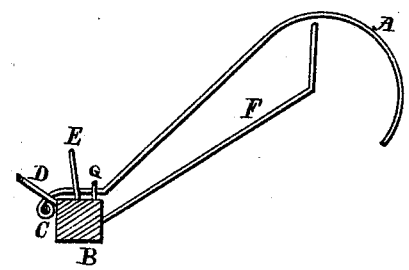
Figure 1:
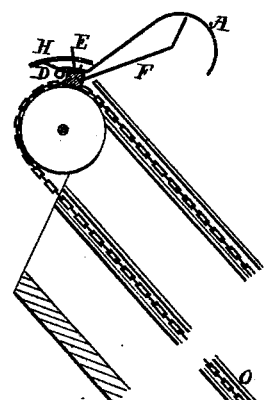
Figure 3:
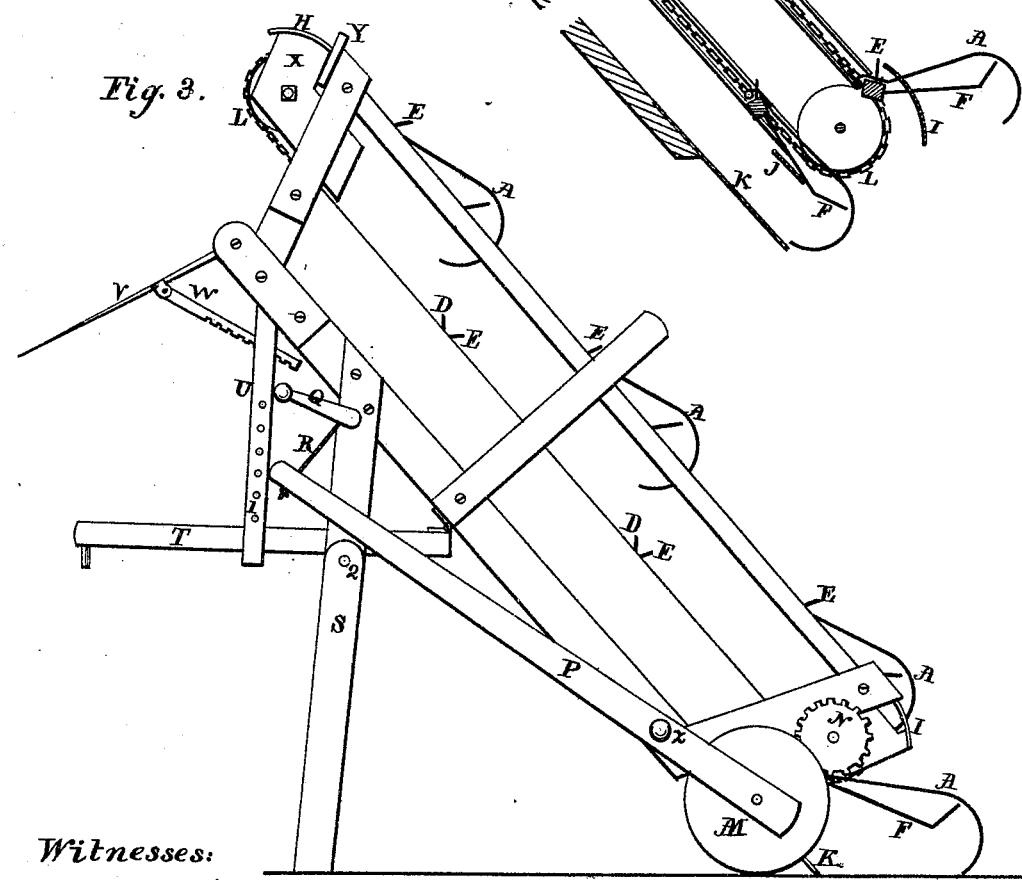

Figure 1 is a cross-section of the elevator, showing the endless chain, with rakes attached, passing over the pulleys and through grooves in the side of the frame. Fig. 2 is an end view of a rake-head with teeth A and trips D E F attached. Fig. 3 is a side view of the entire machine.

My machine, when running, is intended to have the floor or runway for the hay at an angle of about forty-five degrees to the ground, though, when required, it will operate either above or below that angle.

I make the floor about eight feet long and eight feet wide, and at the lower end I extend it about two feet more by hinging an apron, K, which drags on the ground. From the floor to the lower chain-groove is eighteen inches, and the top groove is eighteen inches above that. I intend to use seven rakes.

Motion is given to the chains by cogs on ground-wheel M, gearing into the wheel N, which is fixed on the outer end of a shaft that extends across the machine, with a chain-wheel on it at each side, on a line to deliver the chains into the grooves O O.

The gearing is so arranged that the rakes ascend on the lower side of the pulleys and descend upon the upper.

As the rake emerges from the top groove the trip or trigger E on the rake-head is forced back and the tooth A up, by the guide I, till it has passed to the lower curve of the chain, and at that point the trip E is forced from guide I, and lets the points of the rake-teeth drop on the ground just as the rake begins to make a forward motion. Now, as the apron K is liable to be thrown up or down by the inequalities of the ground, to prevent the teeth from catching under its lower edge, I fix a loop or staple, J, upon one of the vertical sides of apron K, which strikes the long trip F just before the teeth get to the platform, thereby raising them slightly over the lower end, no matter what may be its position; then the rake is free to pass to the top of the floor, and just as the points of the teeth get to the extreme upper end of the elevator the trip D is forced back by the guide H, and the rake A up and away from the load of the next rake. The guide H is a trifle lower just at the top, in order to throw the points of the teeth entirely free from the hay they have just brought up. The trip D is nearer the end of the rake-head than the trip E, and the guide H is not so wide as I, so that trip E passes guide H without touching it, but is caught under guide I. The guide I may be either curved or straight; but guide H should have the curve of the wheel.

The speed of the rakes is intended to be the same as the motion of the machine over the ground, so that there shall be no lost force exerted in tearing the hay apart, but that it may be rolled in a continuous sheet up the floor.

To enable me to get the hay well toward the front of the load, I hang an apron of slats, V, to the front end of the floor on which the hay is discharged by the rakes A A. This apron I hold at any angle by the notched arm W, which runs through a mortise in the standard U, and is held by any one of the notches catching over a bolt.

The machine is drawn by shaft or tongue T, which is hinged centrally to the bottom of the floor, and the loader is raised or lowered by changing the pin 1 in the holes in standards U.

To support the machine when not in use, and detached from any wagon, legs S are hinged at 2, the end of the lever P, in which is journaled the axle of the ground-wheels, resting on the rounded end. When it is desired to throw the rakes out of gear, the forward end of lever P is raised by the windlass Q, which winds the cord R. The fulcrum being at Z, the wheels M and N are drawn apart, throwing them out of gear, while the hind end of the loader is raised up bodily, the carrying-wheels thus being free when passing from field to field.

The chain-pulleys at both ends have their bearing in blocks X, which are tenoned through the corner-post, and the chains are tightened by the wedges Y.

There is no revolving of rake-heads. The teeth pass down elevated but slightly more than those coming up.

I claim—

1. The rake-head B, teeth A, and trips D, E, and F, in a hay-loader, in combination with the chain L and guides H and I, for the purpose of elevating and dropping the rakes, carrying them up, and returning them down, without essentially changing the direction of their points, and at the same time keeping them all above the hay.

2. The combination, in a hay-loader, of the wheels M, levers P, fulcrums Z, cord R, and windlass Q, for the purpose of ungearing from the rakes, and at the same time lifting the hind end of the loader away from the ground when not in use, or in passing from field to field.

3. The combination, in a hay-loader, of the apron hinged to the floor at its lower end with the staple J, substantially as described, and for the purpose specified.

WM. H. THURSTON.

Witnesses:
J. N. McCLOSKEY,
THOS. S. MINNESS.